(12) United States Patent
Hurt et al.

(10) Patent No.: US 12,729,774 B2
(45) Date of Patent: Sep. 8, 2026

(54) CHECK VALVE FOR BACKFLOW PREVENTER

(71) Applicant: Zurn Water, LLC, Milwaukee, WI (US)

(72) Inventors: Timothy Hurt, Langhome, PA (US); Travis Williams, Paso Robles, CA (US); Christopher J. Corral, Paso Robles, CA (US); Kevin P. Brouwers, Lake Oswego, OR (US); Ersen Boran, Warminster, PA (US)

(73) Assignee: Zurn Water, LLC, Milwaukee, WI (US)

( * ) Notice: Subject to any disclaimer, the term of this patent is extended or adjusted under 35 U.S.C. 154(b) by 0 days.

(21) Appl. No.: 18/949,727

(22) Filed: Nov. 15, 2024

(65) Prior Publication Data

US 2025/0164021 A1 May 22, 2025

Related U.S. Application Data

(60) Provisional application No. 63/599,847, filed on Nov. 16, 2023.

(51) Int. Cl.
*F16K 15/03* (2006.01)
*E03B 7/07* (2006.01)

(52) U.S. Cl.
CPC ............ *F16K 15/033* (2013.01); *E03B 7/077* (2013.01)

(58) Field of Classification Search
CPC ....... F16K 15/033; F16K 15/035; E03B 7/077
See application file for complete search history.

(56) References Cited

U.S. PATENT DOCUMENTS

| | | | | |
|---|---|---|---|---|
| 1,871,536 A * | 8/1932 | Le Bus | E21B 21/10 | 137/515 |
| 2,837,103 A * | 6/1958 | Ksieski | F16K 17/363 | 244/135 R |
| 3,283,772 A | 11/1966 | Ensign | | |
| 3,478,778 A * | 11/1969 | Curtiss | E03C 1/106 | 137/530 |

(Continued)

FOREIGN PATENT DOCUMENTS

| | | |
|---|---|---|
| CN | 106704643 A | 5/2017 |
| GB | 1006566 A | 10/1965 |

OTHER PUBLICATIONS

AMES Fire and Waterworks, Colt 200 Sereis BFG Product Sheet, 2008, 4 pages.

*Primary Examiner* — Patrick C Williams
(74) *Attorney, Agent, or Firm* — Husch Blackwell LLP

(57) ABSTRACT

A check valve is provided to prevent backflow of fluid in a backflow preventer or plumbing system having a housing and a fluid flow channel therethrough. The check valve includes a valve seat, a poppet movable between a closed position where the poppet is positioned against the valve seat and inhibits fluid flow past the valve seat and an open position where the poppet is spaced apart from the valve seat and permits fluid flow past the valve seat. The check valve includes a guide portion including a first guide surface and a second guide surface, a first stem coupled to the poppet and movable along the first guide surface, a second stem coupled to the poppet and movable along the second guide surface, and a biasing member coupled between the first stem and the second stem for biasing the poppet to the closed position.

20 Claims, 11 Drawing Sheets

(56) References Cited

U.S. PATENT DOCUMENTS 3,996,962 A * 12/1976 Sutherland ............ F16K 15/033
137/215
4,625,746 A * 12/1986 Calvin ................ F16L 55/1007
137/614.04
4,860,790 A 8/1989 Scaramucci
4,898,130 A * 2/1990 Parsons ............... F01L 13/0015
251/238
5,046,525 A 9/1991 Powell
5,085,076 A 2/1992 Engelmann
5,236,009 A 8/1993 Ackroyd
5,584,315 A 12/1996 Powell
5,669,405 A 9/1997 Engelmann
5,709,240 A 1/1998 Martin et al.
5,711,341 A 1/1998 Funderburk et al.
5,713,240 A 2/1998 Engelmann
5,794,655 A 8/1998 Funderburk et al.
6,050,293 A 4/2000 Lin et al.
6,343,618 B1 2/2002 Britt et al.
6,443,184 B1 * 9/2002 Funderburk .......... F16K 15/066
137/535
6,502,598 B2 1/2003 Engelmann
6,648,013 B1 11/2003 Ray
6,663,079 B1 12/2003 Bottenfield
6,694,996 B2 2/2004 Funderburk
6,901,954 B2 6/2005 Liebert
8,844,562 B2 9/2014 Powell
8,875,733 B2 11/2014 Powell
8,887,756 B2 11/2014 Powell
9,982,793 B2 5/2018 Thomas et al.
9,982,794 B2 5/2018 Thomas
10,132,418 B2 11/2018 Diaz
2006/0081292 A1 4/2006 Sarno et al.
2006/0266422 A1 11/2006 Feenstra et al.
2007/0267069 A1 11/2007 Sarno et al.

* cited by examiner 78
62
82
78
66
42

38
26
30
10
70
58
54
50
34
46
14

90
42
38
30

46
78
50
98
84
54
94
58
62
102
θ2
θ1
102
70
Z
74
48
36
34
18
26
14
86
22

CHECK VALVE FOR BACKFLOW PREVENTER

CROSS-REFERENCE TO RELATED APPLICATION

This application claims the benefit of U.S. Provisional Patent Application No. 63/599,847 filed Nov. 16, 2023, the entire contents of which is incorporated by reference herein.

TECHNICAL FIELD

The present application relates to fluid valves, and particularly a check valve for a backflow preventer.

Check valves traditionally allow flow in one direction while preventing reverse flow. In some cases, a poppet (e.g., a disc) of a check valve generally remains in a fluid flow path in an open position.

SUMMARY

In one independent aspect, a check valve is provided for a backflow preventer having a housing and a fluid flow channel therethrough. The check valve includes: a valve seat; a poppet movable between a closed position and an open position, the poppet positioned against the valve seat and inhibiting fluid flow past the valve seat while the poppet is in the closed position, the poppet spaced apart from the valve seat and permitting fluid flow past the valve seat while the poppet is in the open position; a guide portion including a first guide surface and a second guide surface; a first stem coupled to the poppet and movable along the first guide surface; a second stem coupled to the poppet and movable along the second guide surface; and a biasing member coupled between the first stem and the second stem, the biasing member configured to create an effective closing force that biases the poppet to the closed position.

In some aspects, the first guide surface is positioned along an upper portion of the guide portion, and the second guide surface is positioned along a lower portion of the guide portion.

In some aspects, the first stem includes a first roller for engaging the first guide surface and the second stem includes a second roller for engaging the second guide surface, wherein, as the poppet moves from the closed position to the open position, a biasing force exerted by the biasing member on the first stem increases as the first roller moves along the first guide surface.

In some aspects, the second guide surface includes a first portion and a second portion, wherein, as the poppet moves from the closed position to the open position, the second roller moves sequentially through the first portion of the second guide surface and then the second portion of the second guide surface, a biasing force exerted by the biasing member increasing as the second roller moves along the first portion of the second guide surface and the biasing force decreases as the second roller moves along the second portion of the second guide surface, the effective closing force being greater when the second stem engages the first portion of the second guide than when the second stem engages the second portion of the second guide.

In some aspects, the poppet includes a first elongated slot and a second elongated slot, wherein the first stem extends through and is movable within the first elongated slot and the second stem extends through and is movable within the second elongated slot.

In some aspects, the first stem includes a first roller for engaging the first guide surface and the second stem includes a second roller for engaging the second guide surface, wherein the biasing member exerts a force to bias the first roller into engagement with the first guide surface and bias the second roller into engagement with the second guide surface.

In some aspects, the lower guide track contains a stop that limits the movement of the second stem along the second guide surface.

In some aspects, the poppet is configured to be supported for pivoting movement relative to the housing of the backflow preventer, wherein when the poppet is in a fully opened position, the poppet is out of a fluid flow path.

In some aspects, the first guide surface includes a first inclined portion and the second guide surface includes a second inclined portion, the first inclined portion and the second inclined portion diverging from one another as they extend away from the seat.

In another independent aspect, a check valve is provided for a backflow preventer having a housing and a fluid flow channel therethrough. The check valve includes: a seat including a sealing edge; a poppet including a sealing portion, the poppet movable between a closed position and an open position, the sealing portion of the poppet positioned against the seat and inhibiting fluid flow past the seat while the poppet is in the closed position, the poppet spaced apart from the seat and permitting fluid flow past the seat while the poppet is in the open position; a guide portion coupled to the seat and including a first guide surface and a second guide surface; a first stem coupled to the poppet and movable along the first guide surface; a second stem coupled to the poppet and movable along the second guide surface; and a biasing member coupled between the first stem and the second stem, the biasing member exerting a biasing force to draw the first stem and the second stem toward one another, thereby biasing the sealing portion of the poppet against the sealing edge, the first guide surface and the second guide surface having a shape that transfers at least a portion of the biasing force in a direction that is normal to the sealing edge while the poppet is in the closed position.

In some aspects, the first guide surface includes a first inclined portion and the second guide surface includes a second inclined portion, the first inclined portion and the second inclined portion extending away from the seat in diverging directions.

In some aspects, the first inclined surface is positioned along an upper portion of the guide portion, and the second inclined surface is positioned along a lower portion of the guide portion.

In some aspects, the first stem includes a first roller for engaging the first inclined portion, wherein the second stem includes a second roller for engaging the second inclined portion.

In some aspects, the poppet includes a first elongated slot and a second elongated slot, wherein the first stem extends through and is movable within the first elongated slot and the second stem extends through and is movable within the second elongated slot.

In some aspects, the poppet is configured to be supported for pivoting movement relative to the housing of the backflow preventer, wherein when the poppet is in a fully opened position, the poppet is out of a fluid flow path.

In yet another independent aspect, a check valve is provided for a backflow preventer having a housing and a fluid flow channel therethrough. The check valve includes: a seat including a sealing edge; a poppet including a sealing portion, the poppet movable between a closed position and an open position, the sealing portion of the poppet positioned against the seat and inhibiting fluid flow past the seat while the poppet is in the closed position, the poppet spaced apart from the seat and permitting fluid flow past the seat while the poppet is in the open position; a guide portion coupled to the seat and including a first guide surface and a second guide surface; a first stem coupled to the poppet, the first stem including a first roller for engaging the first guide surface; a second stem coupled to the poppet, the second stem including a second roller for engaging the second guide surface; and a biasing member coupled between the first stem and the second stem, the biasing member exerting a biasing force to draw the first stem and the second stem toward one another, thereby biasing the sealing portion of the poppet against the sealing edge while the poppet is in the closed position, the first guide surface and the second guide surface having a shape that transfers at least a portion of the biasing force in a direction that is normal to the sealing edge while the poppet is in the closed position.

In some aspects, the first guide surface includes a first inclined portion and the second guide surface includes a second inclined portion, the first inclined portion and the second inclined portion extending away from the seat in diverging directions.

In some aspects, as the poppet moves from the closed position to the open position, a biasing force exerted by the biasing member on the first stem increases as the first roller moves along the first guide surface.

In some aspects, the poppet includes a first elongated slot and a second elongated slot, wherein the first stem extends through and is movable within the first elongated slot and the second stem extends through and is movable within the second elongated slot.

In some aspects, the poppet is configured to be supported for pivoting movement relative to the housing of the backflow preventer, wherein when the poppet is in a fully opened position, the poppet is out of a fluid flow path.

Other aspects of the disclosure will become apparent by consideration of the detailed description and accompanying drawings.

DETAILED DESCRIPTION

Before any embodiments are explained in detail, it is to be understood that the disclosure is not limited in its application to the details of the configuration and arrangement of components set forth in the following description or illustrated in the accompanying drawings. The disclosure is capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
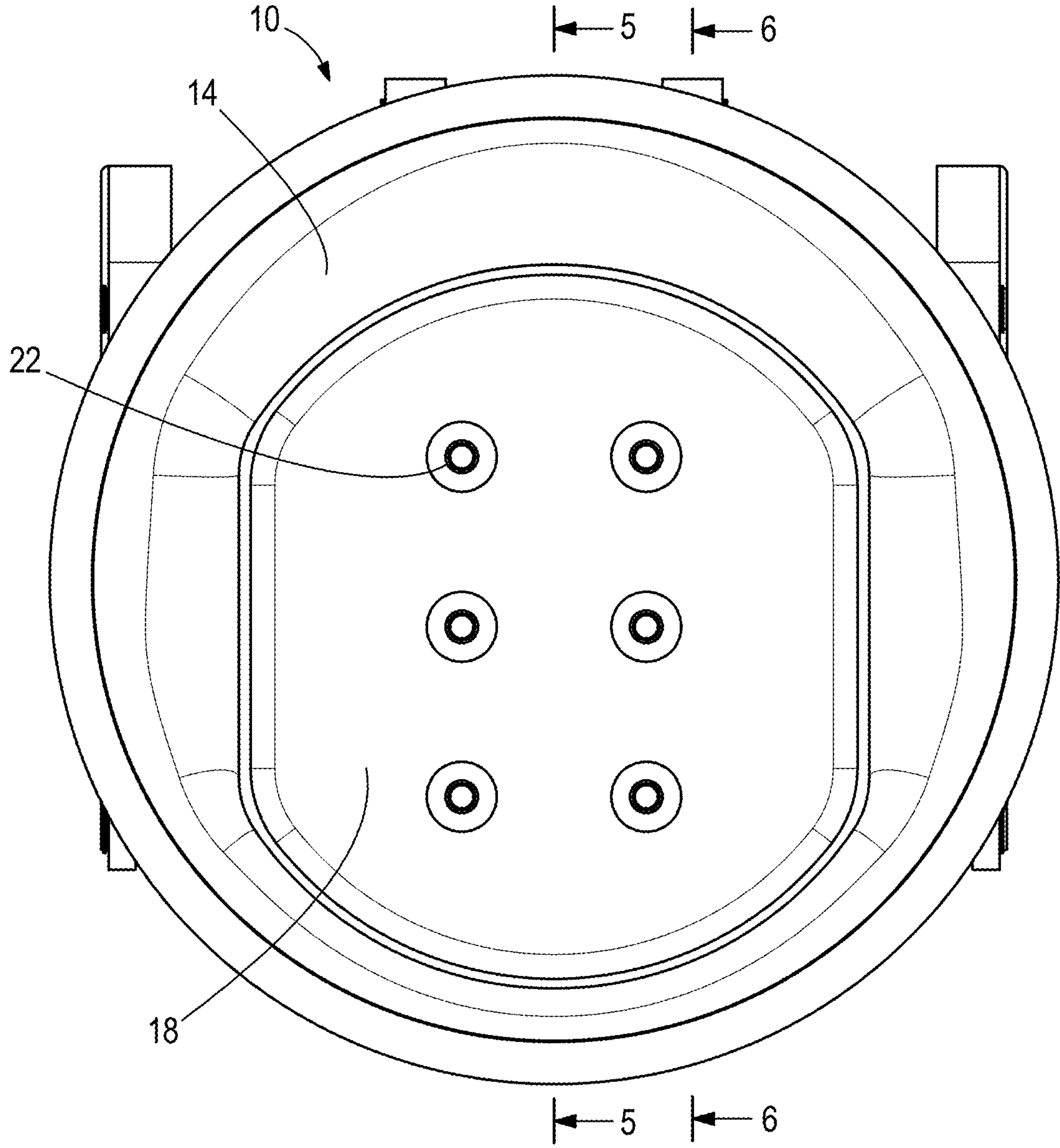
FIG. 1 is a front view of an embodiment of a check valve.
Figure 2:
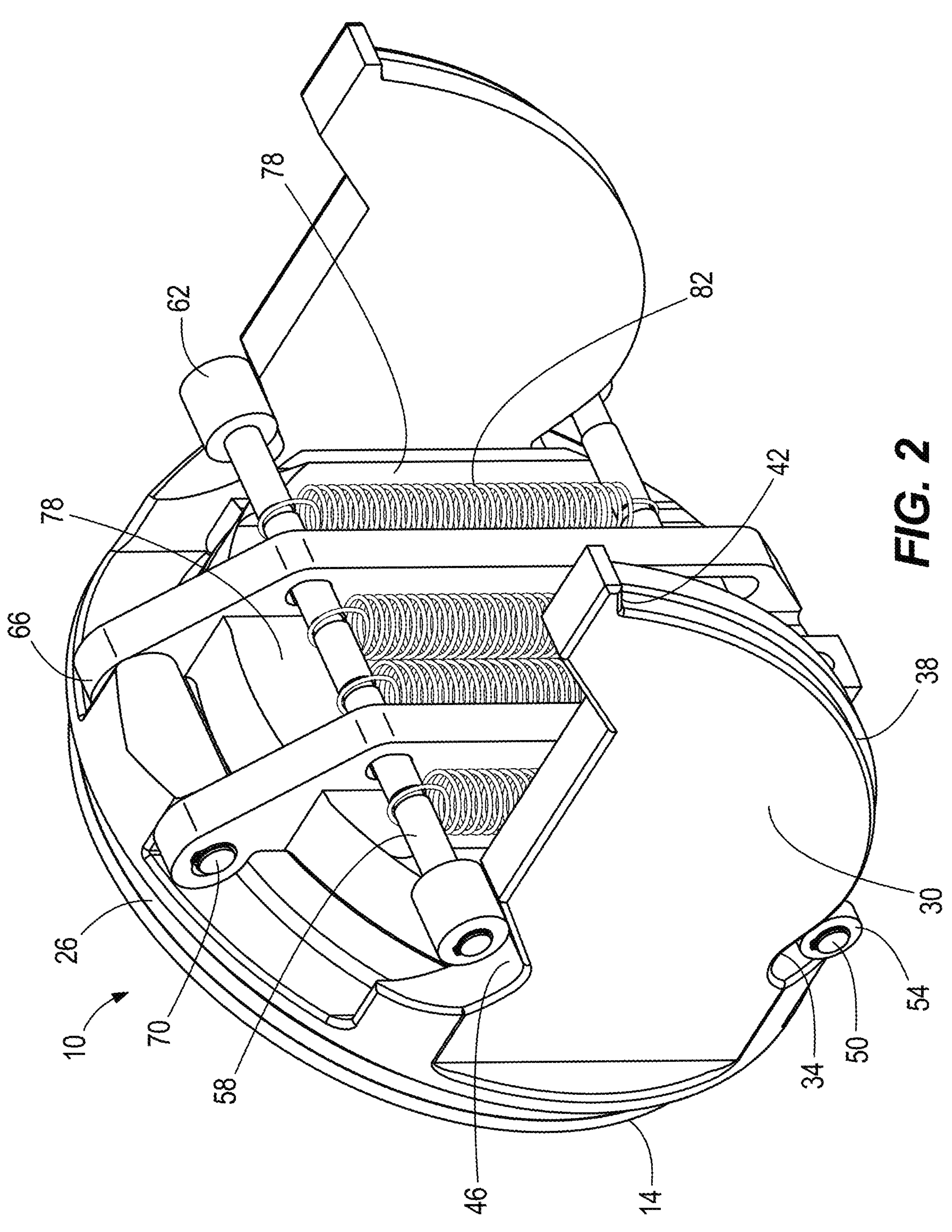
FIG. 2 is a perspective view of the check valve of FIG. 1.

FIGS. 1-11 illustrate a check valve 10. As shown in FIG. 2, the check valve 10 includes a seat 14, one or more guides 30, and a poppet 78. An outermost portion of the check valve 10 is the outer diameter of the seat 14, allowing the check valve 10 to fit within a profile of a round pipe (not shown). In some embodiments, the check valve 10 is positioned in a valve body. The poppet 78 may be connected on an upstream or inlet side 86 to a disk 18 (FIG. 1) via one or more fasteners 22. A seal ring 102 (FIG. 5) can form a seal between the disk 18 and a sealing edge 106 located on a downstream or outlet side 90 of the seat 14. The sealing edge 106 may be flat or may have a ridge 110 (FIG. 7) that extends towards the outlet side 90 to better engage with the seal ring 102 of the poppet 78. The disk 18 holds the seal ring 102 in place on the poppet 78 and sits substantially within the seat 14 when the poppet 78 is in a closed position.

Figure 3:
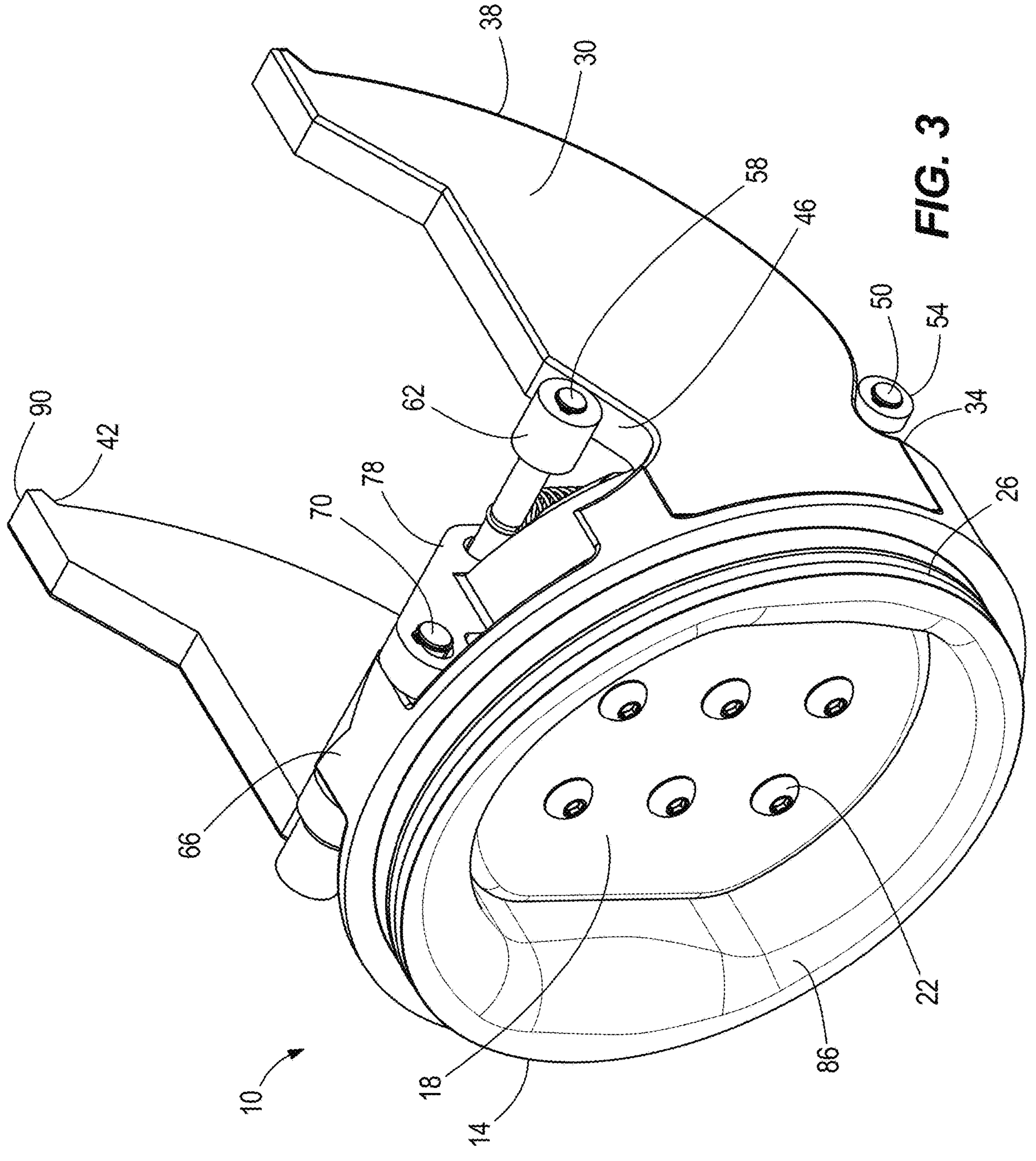
FIG. 3 is another perspective view of the check valve of FIG. 1.
Figure 4:
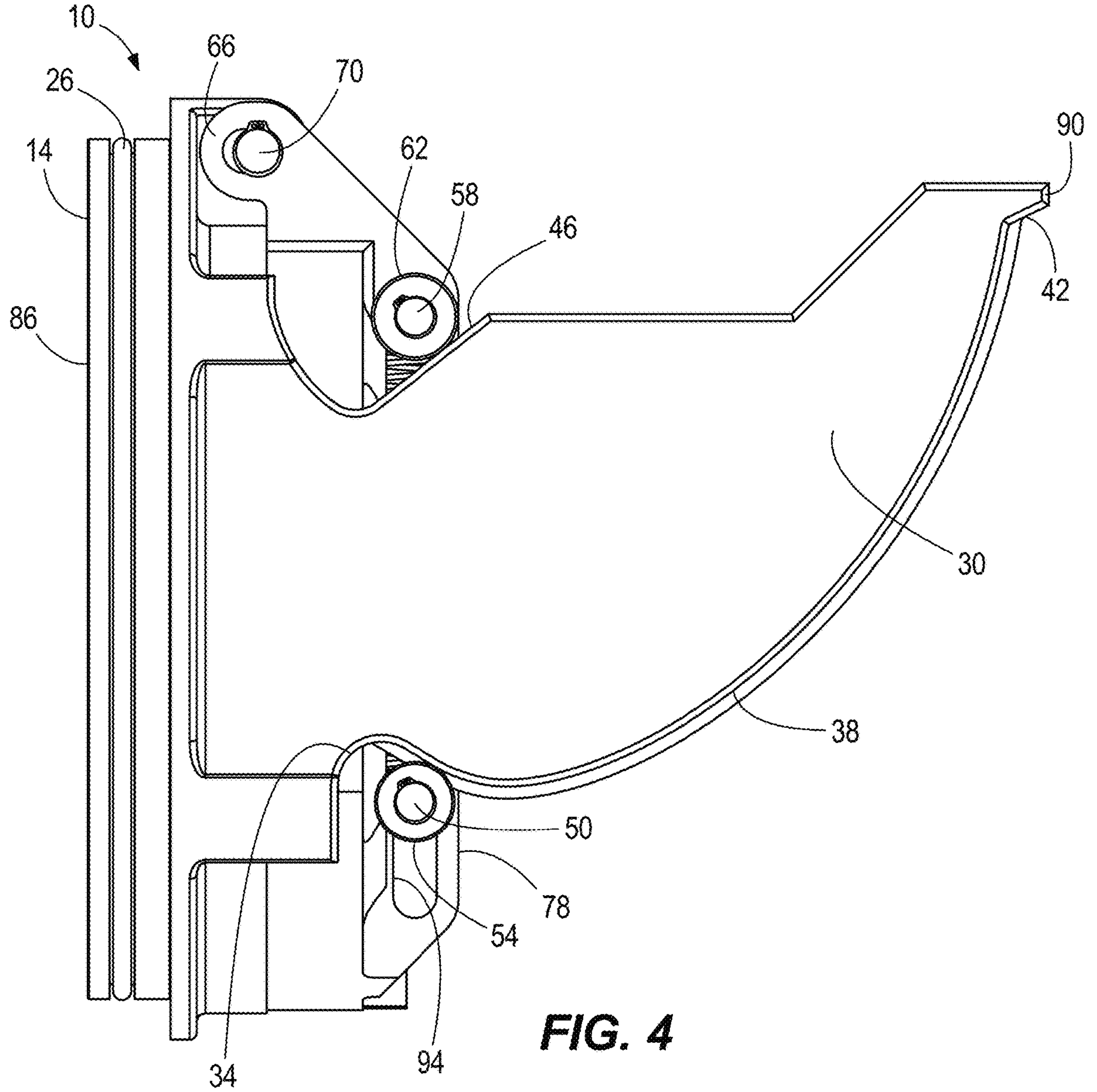
FIG. 4 is a side view of the check valve of FIG. 1.
Figure 5:
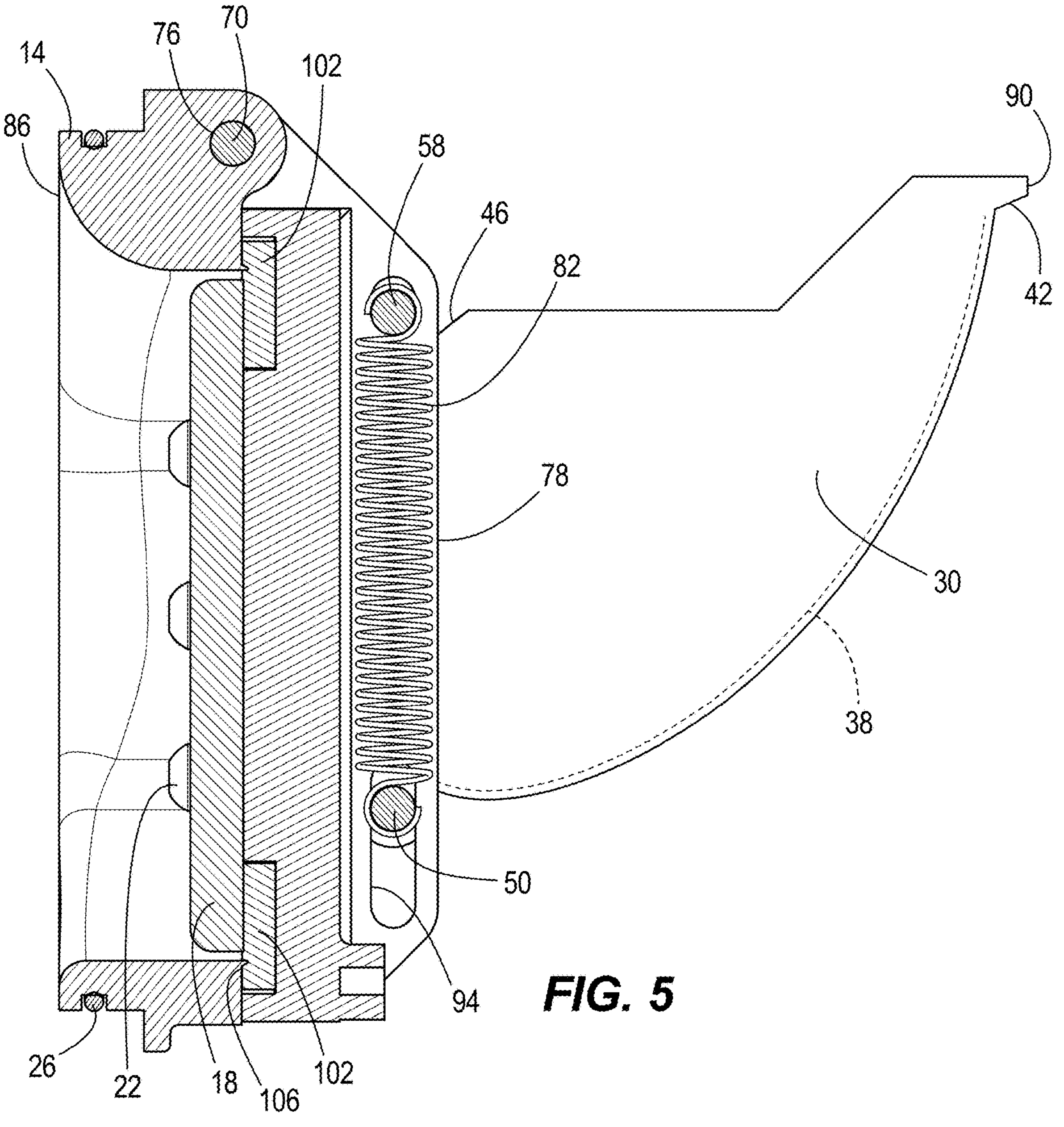
FIG. 5 is a section view of the check valve of FIG. 1 in a closed position viewed along section 5-5.
Figure 6:
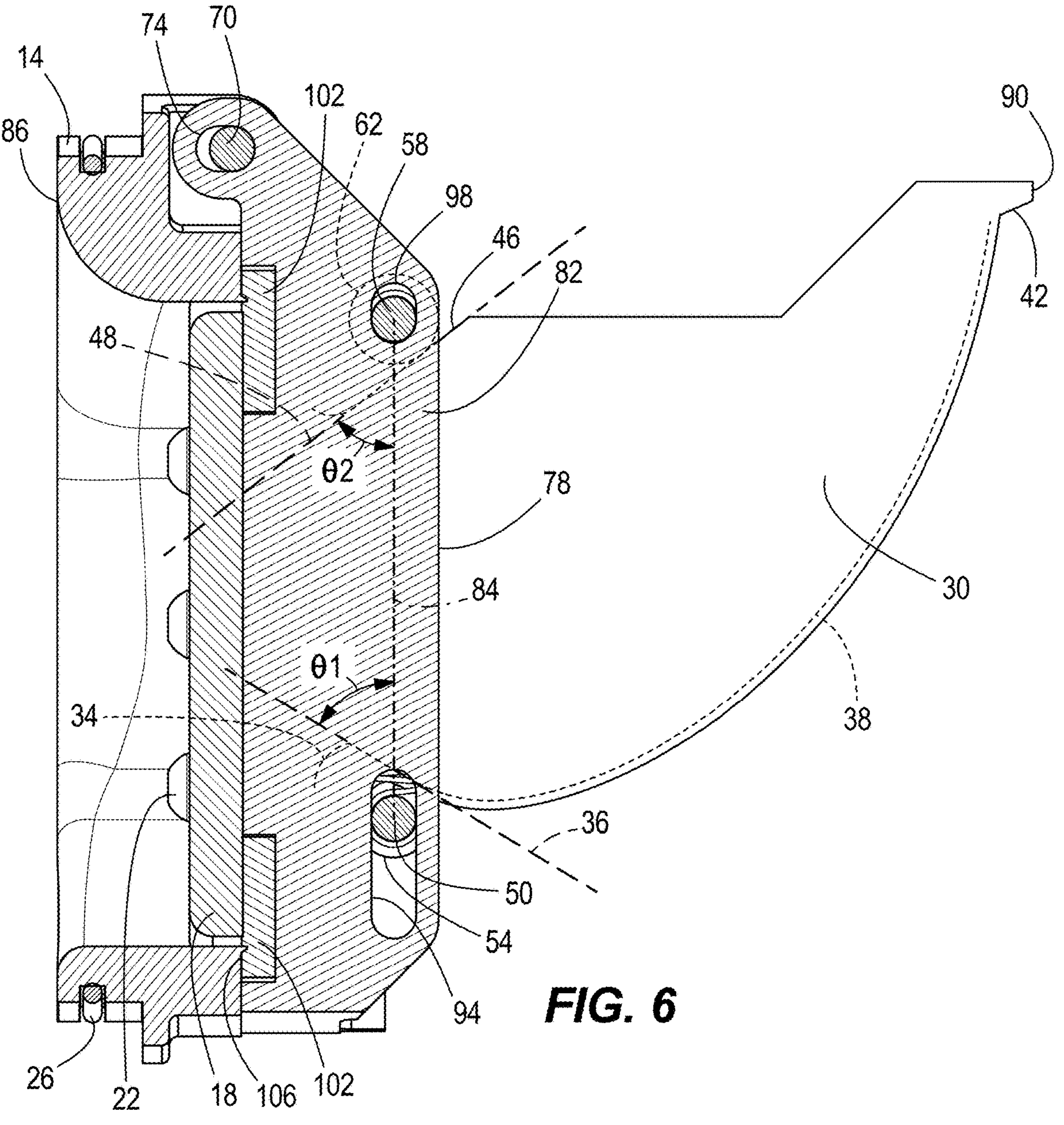
FIG. 6 is a section view of the check valve of FIG. 1 in a closed position viewed along section 6-6.
Figure 7:
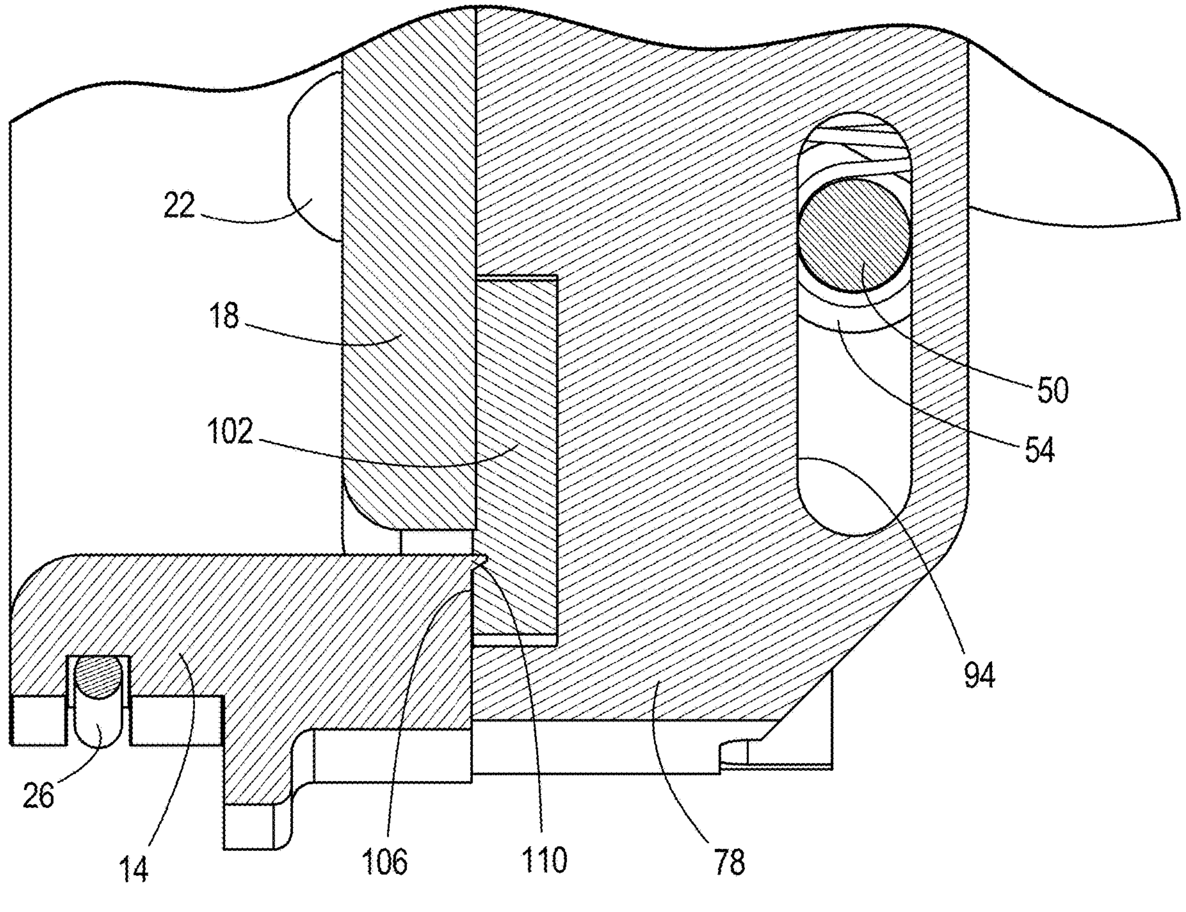
FIG. 7 is an enlarged section view of a portion of the check valve of FIG. 6.

The seat 14 may include a seal groove 26, and a seal (e.g., O-ring) may be positioned in the seal groove 26 and seal between the seat 14 and a round pipe, valve body, housing, or the like. As shown in FIGS. 2-4, the one or more guide pieces 30 may be coupled to the outlet side 90 of the seat 14, each guide piece 30 including an upper guide track 46, a lower guide track 38, a lower guide holder 34, and a stop 42. In the illustrated embodiment the poppet 78 is coupled to the seat 14 by a hinge 66, which may include a hinge pin 70 and a hinge slot 74 (FIG. 6). Also, in the illustrated embodiment, neither the guide pieces 30 nor the hinge 66 protrude outwardly of the outer diameter of the seat 14.

As shown in FIG. 6, the check valve 10 includes an upper stem 58 (e.g., a rod or shaft) that extends through an upper guide slot or upper stem slot 98 on the poppet 78. Additionally, a lower stem 50 (e.g., a rod or shaft) extends through a lower guide slot or lower stem slot 94 on the poppet 78. In the illustrated embodiment, both the upper stem 58 and lower stem 50 are oriented in a lateral direction (i.e., in a direction perpendicular to the guides 30, which extend in a downstream direction from the seat 14). As shown in FIGS. 2-4, upper guide rollers 62 are positioned adjacent the ends of the upper stem 58. The upper guide rollers 62 engage or contact and move along the upper guide tracks 46. Lower guide rollers 54 are positioned adjacent the ends of the lower stem 50. The lower guide rollers 54 are configured to engage or contact and move along the lower guide holders 34, lower guide tracks 38, and stops 42. As shown in FIG. 6, the upper stem 58 sits within the upper stem slot 98 in the poppet 78. The upper stem slot 98 may be elongated such that the upper stem 58 is permitted to move within the upper stem slot 98 in the direction of elongation but generally constrained against movement in a direction perpendicular to the direction of elongation. Similarly, the lower stem 50 sits within the lower stem slot 94 and is movable within the lower stem slot 94 in a first direction but generally constrained from movement in a second perpendicular direction. The distal or lower end of the lower stem slot 94 can be closed (as shown in the present embodiment) or open, but the lower stem 50 does move out of the lower stem slot 94 during normal operation. An open lower end of the lower stem slot 94 may be used for assembly or maintenance purposes for the check valve 10.

In some embodiments, biasing members 82 (e.g., extension springs) are coupled between the upper stem 58 and the lower stem 50. The force created by the one or more biasing members 82 may bias the upper stem 58 and lower stem 50 toward one another. The shape or profile of the upper guide tracks 46, the lower guide holders 34, and lower guide tracks 38 cause a portion of this spring force to bias the poppet 78 towards the seat 14. The number and strength of the biasing members 82 can be changed depending on the requirements of the system the guided check valve 10 is installed in.

FIGS. 6-11 illustrate the check valve 10 as the poppet 78 moves through its range of motion (e.g., from a closed position to a fully open position). When the force exerted on the poppet 78 by fluid pressure on the inlet side 86 of the valve 10 is less than the combined force of fluid pressure on the outlet side 90 of the valve 10 and the effective horizontal biasing force of the biasing members 82, the check valve 10 remains or moves towards the closed position shown in FIGS. 6 and 7. When the poppet 78 is in a closed position, the effective horizontal biasing force on the poppet 78 created by the biasing members 82 creates a positive seal between the seal ring 102 and sealing edge 106.

When a force applied by fluid pressure on the inlet side 86 of the guided check valve 10 exceeds the combined force of the effective horizontal biasing force and the force applied by fluid pressure on the outlet side 90 of the guided check valve 10, the poppet 78 will begin to move from the closed position. As the poppet 78 moves, the upper guide rollers 62 slide or roll along the upper guide tracks 46 and the lower guide rollers 54 slide or roll out of the lower guide holders 34 and along the lower guide tracks 38 as illustrated in FIGS. 8-11. During movement of the poppet 78, the hinge pin 70 may move within the slot 74 to provide smooth movement of the poppet 78 and to ensure the poppet 78 does not bind or become stuck as rollers 54, 62 move along the tracks 38, 46.

Figure 8:
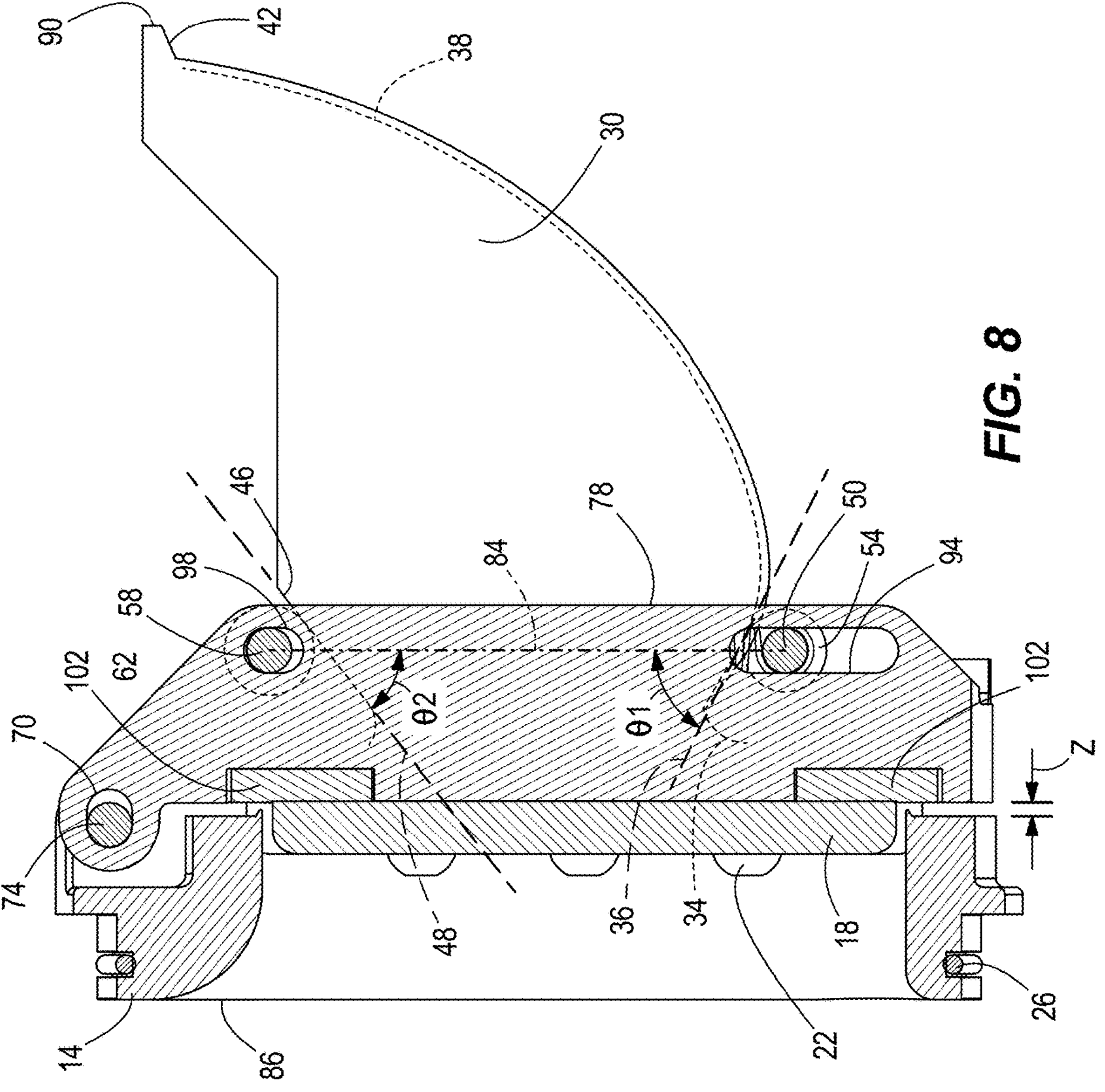
FIG. 8 is a section view of the check valve of FIG. 1 in a first opening position, viewed along section 6-6.

In a first opening position (FIG. 8), the poppet 78 may begin to move horizontally or axially away from the seat 14 such that the seal ring 102 disengages from the sealing edge 106. The poppet 78 may begin to move axially until the hinge pin 70 and slot 74 can no longer move axially relative to each other (i.e., hinge pin 70 abuts a distal end of the slot 74), at which point the poppet 78 may begin to pivot open about the hinge pin 70. In the illustrated embodiment, the poppet 78 may include the elongated slot 74 that allows for "play" or relative movement of the hinge pin 70 within the slot 74, and the seat 14 may include a through hole or aperture 76 (FIG. 5) that is sized approximately the same as the hinge pin 70 such that there is no axial movement of the hinge pin 70 relative to the aperture 76. In some embodiments, the slot 74 may be part of the seat 14 and the aperture 76 may be part of the poppet 78. In some embodiments, both the seat 14 and the poppet 78 may each include slots 74. As shown in FIG. 8, the slot 74 may include enough "play" or "slack" relative to the hinge pin 70 such that the seal ring 102 and sealing edge 106 may be spaced apart a distance "Z" before the poppet 78 is forced to begin pivoting.

In the first opening position, the upper stem 58 moves upward within the upper stem slot 98 and the upper guide rollers 62 move upward along the inclined surface of upper guide tracks 46. Similarly, the lower stem 50 moves downward within the lower stem slot 94 and the lower guide rollers 54 move downward along the inclined surface of the lower guide holders 34 (e.g., the surface of the lower guide holders 34 diverges from the surface of the upper guide rollers 62 as the surfaces extend away from the seat 14). As such, the distance between the upper stem 58 and lower stem 50 increases, and the springs or biasing members 82 coupled to the upper stem 58 and lower stem 50 resist or bias against this movement and increased distance, thereby creating an effective horizontal biasing force on the poppet 78. As shown in the illustrated embodiment, the surface of lower guide holders 34 may be curved such that the incline or angle of the surface is not constant. In some embodiments, the surface of the upper guide tracks 46 may be curved or otherwise have a non-constant surface angle or incline.

In a second opening position (FIG. 9), as the poppet 78 continues to open, an upper end of the poppet 78 is constrained from further axial movement away from the seat 14 by the hinge pin 70 and slot 74 interference. The poppet 78 may begin to pivot or swing open about the hinge pin 70. As the poppet 78 pivots, the upper guide rollers 62 continue to move upwards along the inclined surface of the upper guide tracks 46, and the lower guide rollers 54 transition from moving downward along the inclined surface of the lower guide holders 34 to moving along the lower guide tracks 38 (e.g., the lower guide rollers 54 may crest over a transition from the lower guide holders 34 to the lower guide tracks 38). As shown in the illustrated embodiment, the lower guide holders 34 and guide tracks 38 may form a convex surface. As the poppet 78 opens, the lower guide rollers 54 may move downwards along the lower guide holders 34 and may move upwards along the lower guide tracks 38.

The surface or profile of the lower guide track 38 and upper guide track 46 may be configured such that the upper stem 58 and lower stem 50 continue moving further apart as the poppet 78 pivots open, increasing the magnitude of the biasing force of the one or more biasing members 82 that biases the upper stem 58 and lower stem 50 towards each other. The amount of effective closing force that biases the poppet 78 in the closed direction may be a function of (i) the magnitude of the biasing force that biases the upper stem 58 and lower stem 50 towards each other and (ii) the angle θ1 between the line of action 84 of the biasing force of the biasing members 82 (e.g., in the direction between the upper stem 58 and lower stem 50) and a line of tangency 36 of the surface of the lower guide track 38 or lower guide holder 34 where the lower guide roller 54 contacts the lower guide track 38 or lower guide holder 34 (e.g., a plane normal to the surface of the lower guide track 38 or lower guide holder 34 at the point of contact of the lower guide roller 54).

Specifically, the effective closing force that biases the poppet 78 closed may at least partially be a cosine function of θ1. As the line of action 84 approaches a normal or perpendicular orientation relative to the line of tangency 36 at the point of contact of lower guide roller 54 (i.e., θ1 approaches ninety degrees), little to none of the biasing force of the biasing member 82 is translated through the lower stem 50 into an effective closing force of the poppet 78 (i.e., the cosine function factor approaches zero). As the line of action 84 deviates from a normal or perpendicular orientation towards a parallel orientation relative to the line of tangency 36 (i.e., θ1 decreases towards zero degrees or increases towards one hundred eighty degrees), more of the biasing force of the biasing member 82 is translated through the lower stem 50 into an effective closing force of the poppet 78 (i.e., the cosine function factor increases). When the upper guide rollers 62 are in contact with the upper guide tracks 46 and the upper stem 58 has not bottomed out at a lowest position in the upper stem slot 98, the effective closing force may also be a function of the angle θ2 between the line of action 84 of the biasing force of the biasing members 82 and a line of tangency 48 of the surface of the upper guide tracks 46 where the upper guide roller 62 contacts the upper guide tracks 46.

In a third opening position (FIG. 10), the poppet 78 can pivot further open to the point the upper guide rollers 62 no longer contact the upper guide track 46. As such, the upper stem 58 can be biased to move to the lowest position in the upper stem slot 98 (in some configurations, the upper stem 58 may be biased to this lowest position in the upper stem slot 98 prior to the upper guide roller 62 departing from the upper guide track 46 depending on the spacing and configuration of the hinge 66, upper guide tracks 46, and lower guide tracks 38). The lower stem 50 may continue to move down the lower stem slot 94 as the lower guide rollers 54 continue to move along the lower guide tracks 38 toward the stop 42. The spring force along line of action 84 may continue to increase as the upper stem 58 and lower stem 50 move further apart. Once the upper stem 58 "bottoms out" and is biased against the lower end of the upper stem slot 98, the biasing force at the upper stem 58 essentially becomes zero. The biasing force of the biasing member 82 at the lower stem 50 still creates an effective closing force on the poppet 78 depending on the angle θ1 between the line of action 84 of the biasing force and the line of tangency 36 at the lower guide rollers contact.

At a fully open position (FIG. 11), the upper and lower stems 58, 50 may both be at a lowermost position in the upper and lower stem slots 98, 94 furthest away from the hinge 66. In some embodiments, the lower stem slots 94 may extend further or have an open end such that the lower stem 50 never reaches the lowermost position in the lower stem slot 94. In the fully open position, the lower guide rollers 54 and/or lower stems 50 may contact the stops 42 which prevent it from opening or moving further past the stops 42. At the fully open position the biasing members 82 are at their most extended, and the spring force along line of action 84 is at its largest. When fully open the poppet 78 is partially out of the flow path, reducing pressure loss under flow.

If the force provided by fluid pressure to the inlet side 86 of the poppet 78 decreases below the force provided by fluid pressure to the outlet side 90 of the poppet 78 combined with the effective closing force provided by the one or more biasing members 82, the check valve 10 will close, moving back through the positions shown to the closed position (FIG. 6).

Figure 9:
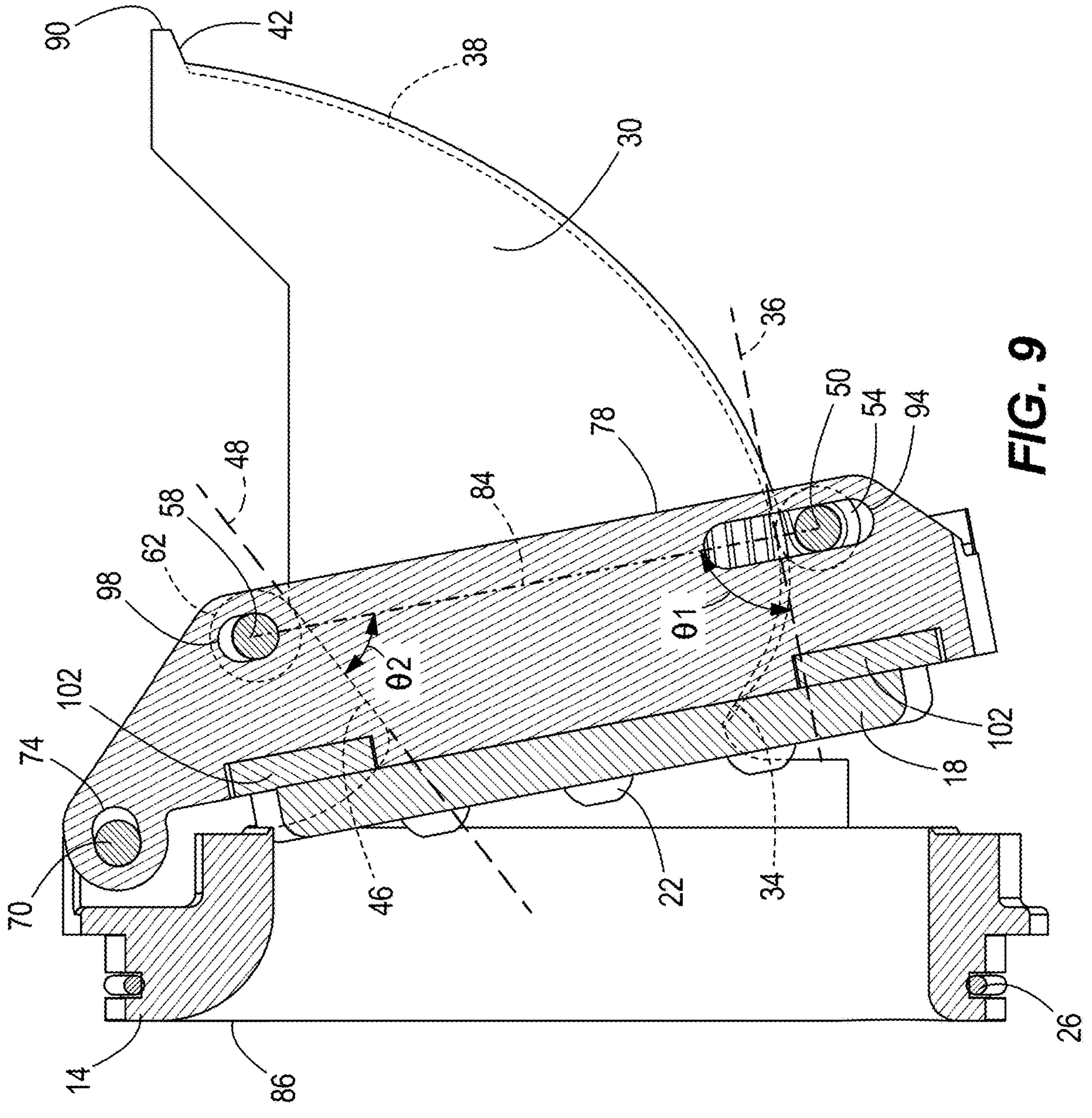
FIG. 9 is a section view of the check valve of FIG. 1 in a second opening position, viewed along section 6-6.
Figure 10:
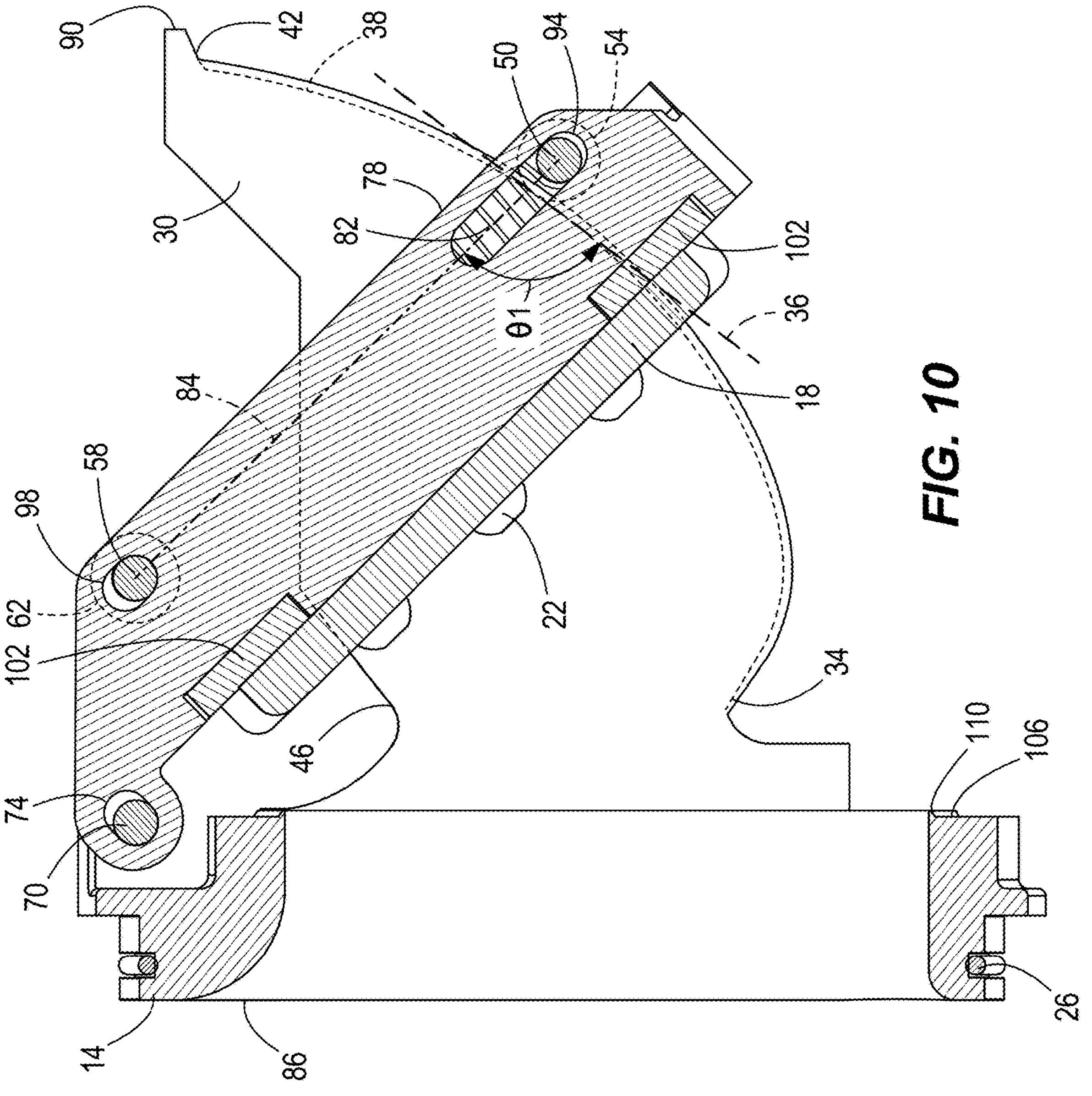
FIG. 10 is a section view of the check valve of FIG. 1 in a third opening position, viewed along section 6-6.
Figure 11:
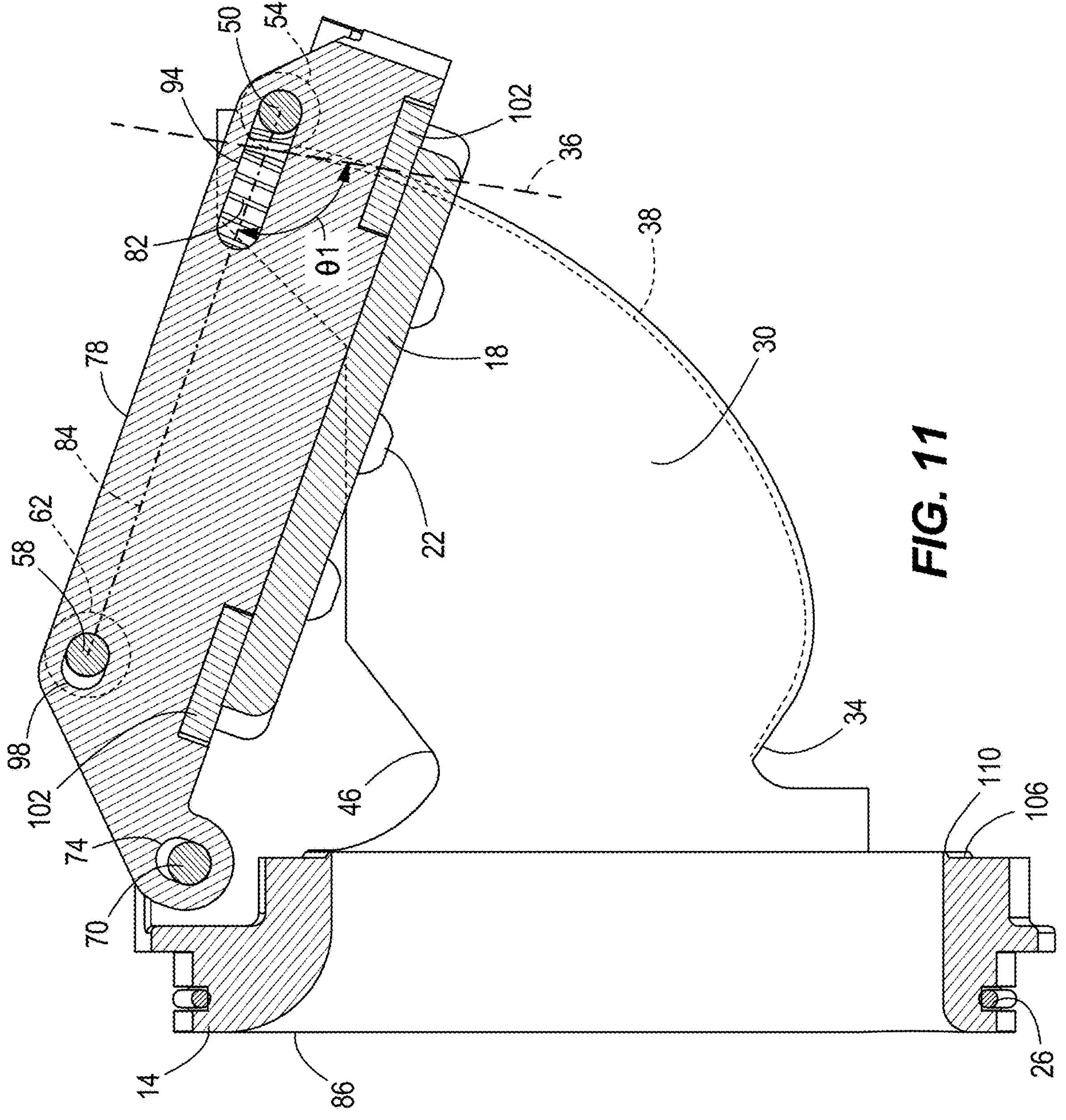
FIG. 11 is a section view of the check valve of FIG. 1 in a fully open position, viewed along section 6-6.

As shown in FIGS. 6 and 8-11, the profiles of the lower guide holder 34 and lower guide track 38 (and upper guide track 46) may be configured such that a greater proportion of the spring force of the biasing members 82 is translated to a closing force when the poppet 78 is in a closed position (FIG. 6) or an initially open position (FIG. 8), and a lesser proportion of the spring force of the biasing members 82 is translated to a closing force as the poppet 78 reaches a more open position (FIGS. 9-11). This may be achieved by having θ1 be smaller in the closed and initially open positions and larger in the more open positions (when normalizing the angle to be between zero and ninety degrees—i.e., a 100° angle normalized to 10°, a 135° angle normalized to 45°, a 160° angle normalized to 20°, etc.). For example, θ1 may be approximately between twenty and seventy degrees in the closed or initially open position and may be approximately between seventy and ninety degrees in the more open positions. Thus, the net effect in such a configuration can be that the effective closing force transferred from the biasing member 82 to close the poppet 78 generally reduces as the poppet 78 opens, and the pressure loss due to fluid flow keeping the poppet 78 open similarly reduces as the poppet 78 opens. Thus, the valve 10 can provide a sufficient closing force to seal and protect against backflow while reducing the effective closing force to reduce pressure loss during normal flow conditions when the poppet 78 is open.

The configuration of the valve 10 and the closing mechanism for the poppet 78 also can provide a compact design with minimal moving components and especially minimal moving components in the normal flow area through the valve 10. The biasing members 82, stems 50, 58, and associated components may generally be provided on the downstream side of the poppet 78 such that they are not exposed to the primary flow. Similarly, the guides 30 may be positioned near a peripheral edge of the valve 10 such that the guides 30 also are not exposed to a central or main area of flow. Thus, the valve 10 can provide a compact and robust design that protects against backflow while reducing pressure loss during normal operating conditions.

In other embodiments, other configurations are possible. For example, those of skill in the art will recognize, according to the principles and concepts disclosed herein, that various combinations, sub-combinations, and substitutions of the components discussed above can provide a guided check valve.

The embodiment(s) described above and illustrated in the figures are presented by way of example only and are not intended as a limitation upon the concepts and principles of the present disclosure. It will be understood that certain features and sub combinations are of utility and may be employed without reference to other features and sub combinations. Features described and illustrated with respect to certain embodiments may also be implemented in other embodiments. This is contemplated by and is within the scope of the claims. Since many possible embodiments of the disclosure may be made without departing from the scope thereof, it is also to be understood that all matters herein set forth or shown in the accompanying drawings are to be interpreted as illustrative and not limiting. As such, it will be appreciated that variations and modifications to the elements and their configuration and/or arrangement exist within the spirit and scope of one or more independent aspects as described.

What is claimed is:

1. A check valve for a backflow preventer having a housing and a fluid flow channel therethrough, the check valve comprising:

- a valve seat;
- a poppet movable between a closed position and an open position, the poppet positioned against the valve seat and inhibiting fluid flow past the valve seat while the poppet is in the closed position, the poppet spaced apart from the valve seat and permitting fluid flow past the valve seat while the poppet is in the open position;
- a guide portion including a first guide surface and a second guide surface;
- a first stem coupled to the poppet and displaceable along the first guide surface;
- a second stem coupled to the poppet and displaceable along the second guide surface; and
- a biasing member coupled between the first stem and the second stem, the biasing member configured to create an effective closing force that biases the poppet to the closed position.

2. The check valve of claim 1, wherein the first stem includes a first roller for engaging the first guide surface and the second stem includes a second roller for engaging the second guide surface.

3. The check valve of claim 2, wherein, as the poppet moves from the closed position to the open position, a biasing force exerted by the biasing member on the first stem increases as the first roller moves along the first guide surface.

4. The check valve of claim 1, wherein the biasing member biases the second stem against the second guide surface such that the effective closing force biases the poppet towards the closed position, wherein the second guide surface includes a first portion and a second portion, wherein, as the poppet moves from the closed position to a fully open position, the second stem moves sequentially along the first portion of the second guide surface and then the second portion of the second guide surface, the effective closing force being greater when the second stem engages the first portion of the second guide surface than when the second stem engages the second portion of the second guide surface.

5. The check valve of claim 1, wherein the poppet includes a first elongated slot and a second elongated slot, wherein the first stem extends through and is movable within the first elongated slot and the second stem extends through and is movable within the second elongated slot.

6. The check valve of claim 1, wherein the first stem includes a first roller for engaging the first guide surface and the second stem includes a second roller for engaging the second guide surface, wherein the biasing member exerts a force along a line of action between the first stem and the second stem to bias the first roller into engagement with the first guide surface and to bias the second roller into engagement with the second guide surface.

7. The check valve of claim 1, wherein the guide portion includes a stop that limits movement of the second stem along the second guide surface.

8. The check valve of claim 1, wherein the poppet is configured to be supported for pivoting movement about a hinge pin relative to the housing of the backflow preventer, the hinge pin extends through an elongated slot such that the hinge pin may move axially relative to the housing.

9. The check valve of claim 1, wherein the first guide surface includes a first inclined portion and the second guide surface includes a second inclined portion, the first inclined portion and the second inclined portion diverging from one another as they extend away from the valve seat.

10. A check valve for a backflow preventer having a housing and a fluid flow channel therethrough, the check valve comprising:

- a seat including a sealing edge;
- a poppet including a sealing portion, the poppet movable between a closed position and an open position, the sealing portion of the poppet positioned against the seat and inhibiting fluid flow past the seat while the poppet is in the closed position, the poppet spaced apart from the seat and permitting fluid flow past the seat while the poppet is in the open position;
- a guide portion coupled to the seat and including a first guide surface and a second guide surface;
- a first stem coupled to the poppet and movable along the first guide surface;
- a second stem coupled to the poppet and movable along the second guide surface; and
- a biasing member coupled between the first stem and the second stem, the biasing member exerting a biasing force to draw the first stem and the second stem toward one another, the first guide surface and the second guide surface having a shape that transfers at least a portion of the biasing force in a direction that is normal to the sealing edge while the poppet is in the closed position.

11. The check valve of claim 10, wherein the first guide surface includes a first inclined portion and the second guide surface includes a second inclined portion, the first inclined portion and the second inclined portion extending away from the seat in diverging directions.

12. The check valve of claim 11, wherein the first stem includes a first roller for engaging the first inclined portion, wherein the second stem includes a second roller for engaging the second inclined portion.

13. The check valve of claim 10, wherein the first stem includes a first roller for engaging the first guide surface, wherein the first guide surface has a convex shape, wherein the first guide surface includes a first portion and a second portion, wherein, as the poppet moves from the closed position to a fully open position, the first roller moves sequentially through the first portion and then the second portion of the first guide surface.

14. The check valve of claim 13, wherein the first roller moves at least partially in a first vertical direction along the first portion of the first guide surface, and wherein the first roller moves at least partially in a second vertical direction along the second portion of the first guide surface, the second vertical direction being opposite the first vertical direction.

15. The check valve of claim 10, wherein the poppet is configured to be supported for pivoting movement relative to the housing of the backflow preventer, wherein when the poppet is in a fully opened position, the poppet is out of a fluid flow path.

16. A check valve for a backflow preventer having a housing and a fluid flow channel therethrough, the check valve comprising:

- a seat including a sealing edge;
- a poppet including a sealing portion, the poppet movable between a closed position and an open position, the sealing portion of the poppet positioned against the seat and inhibiting fluid flow past the seat while the poppet is in the closed position, the poppet spaced apart from the seat and permitting fluid flow past the seat while the poppet is in the open position;
- a guide portion coupled to the seat and including a first guide surface and a second guide surface;
- a first stem coupled to the poppet, the first stem including a first roller for engaging the first guide surface;
- a second stem coupled to the poppet, the second stem including a second roller for engaging the second guide surface; and
- a biasing member coupled between the first stem and the second stem, the biasing member exerting a biasing force to draw the first stem and the second stem toward one another, thereby biasing the sealing portion of the poppet against the sealing edge while the poppet is in the closed position, at least one of the first roller and the second roller engaging a corresponding surface of the first guide surface or the second guide surface that is angled such that the biasing force of the biasing member creates an effective closing force that biases the poppet towards the closed position.

17. The check valve of claim 16, wherein the first guide surface includes a first inclined portion and the second guide surface includes a second inclined portion, the first inclined portion and the second inclined portion extending away from the seat in diverging directions.

18. The check valve of claim 16, wherein the biasing member exerts the biasing force along a line of action between the first stem and the second stem, wherein a surface plane is defined normal to a surface of the first guide surface where the first roller engages the first guide surface, and wherein a first angle between the line of action and the surface plane when the poppet is in the closed position is smaller than a second angle between the line of action and the surface plane when the poppet is in the open position.

19. The check valve of claim 16, wherein the poppet includes a first elongated slot and a second elongated slot, wherein the first stem extends through and is movable within the first elongated slot and the second stem extends through and is movable within the second elongated slot.

20. The check valve of claim 16, wherein the poppet is configured to be supported for pivoting movement relative to the housing of the backflow preventer, wherein when the poppet is in a fully opened position, the poppet is out of a fluid flow path.

* * * * *